(12) United States Patent
Niewczas et al.

(10) Patent No.: US 8,254,325 B2
(45) Date of Patent: Aug. 28, 2012

(54) MULTI-PATH TIMING TRACKING AND IMPAIRMENT MODELING FOR IMPROVED GRAKE RECEIVER PERFORMANCE IN MOBILITY SCENARIOS

(75) Inventors: Jaroslaw Niewczas, Jozefow (PL); Karsten Brueninghaus, Salzgitter (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 279 days.

(21) Appl. No.: 12/829,093

(22) Filed: Jul. 1, 2010

(65) Prior Publication Data
US 2011/0002232 A1 Jan. 6, 2011

Related U.S. Application Data

(60) Provisional application No. 61/224,139, filed on Jul. 9, 2009.

(30) Foreign Application Priority Data

Jul. 1, 2009 (EP) ..................................... 09008615

(51) Int. Cl.
*H04W 4/00* (2009.01)
(52) U.S. Cl. ......... 370/329; 370/252; 370/342; 370/348
(58) Field of Classification Search .................. 370/252, 370/329, 342, 348
See application file for complete search history.

(56) References Cited

U.S. PATENT DOCUMENTS

| | | | | |
|---|---|---|---|---|
| 7,324,584 | B1 * | 1/2008 | Vigneron et al. | 375/150 |
| 8,144,668 | B1 * | 3/2012 | Madhow | 370/335 |
| 2002/0172265 | A1 * | 11/2002 | Kenney | 375/148 |
| 2002/0196733 | A1 * | 12/2002 | Shen et al. | 370/208 |
| 2007/0263704 | A1 * | 11/2007 | Nagarajan et al. | 375/148 |

* cited by examiner

*Primary Examiner* — Hassan Kizou
*Assistant Examiner* — Toan Nguyen

(57) ABSTRACT

Methods and wireless receivers (5) are disclosed for estimating a propagation channel response that includes two closely spaced delays. An exemplary method comprises selecting (720) a plurality of receiver processing delays for sampling the received signal so that that the receiver processing delays span two closely spaced channel response delays, and calculating (730) an average channel coefficient magnitude over at least a first number of time slots of the received signal, for each of the receiver processing delays. The exemplary method further comprises estimating (740) delay timing for each of the two channel response delays, based on the average channel coefficient magnitudes and a multi-delay superposition model for the channel response, and calculating (750) complex channel gains for each of the two channel response delays, based on the estimated delay timings and channel response measurements taken over a second number of time slots that is less than the first number of time slots.

22 Claims, 7 Drawing Sheets

MULTI-PATH TIMING TRACKING AND IMPAIRMENT MODELING FOR IMPROVED GRAKE RECEIVER PERFORMANCE IN MOBILITY SCENARIOS

This application claims the benefit of EP patent application number 09008615.8, filed on Jul. 1, 2009, and U.S. patent application No. 61/224,139 filed on Jul. 9, 2009, the disclosure of which is fully incorporated herein by reference.

TECHNICAL FIELD

The present invention relates generally to wireless communication receivers and, more particularly, to methods and apparatus for estimating propagation channel conditions and signal impairments in a wireless receiver.

BACKGROUND

Time-variant multi-path conditions provide a difficult challenge for WCDMA receiver algorithms. In order to achieve good performance, the receiver must know the instantaneous channel conditions or derived figures (depending on the kind of equalizer/combiner) precisely. However, time-variability of the complex channel gains prevents long-term averaging of measurements or estimates of the channel conditions.

Some receivers use a so-called non-parametric GRAKE approach, calculating pilot sequence variation on each RAKE finger for impairment and noise estimation. This approach is explained, for example, in U.S. Pat. No. 6,363,104 B1, issued Mar. 26, 2002 to G. E. Bottomley, and in G. E. Bottomley, T. Ottosson, and Y.-P. E. Wang, "A generalized RAKE receiver for interference suppression," IEEE J. Sel. Areas in Commun., vol. 18, pp. 1536-1545, August 2000. With this approach, since a single slot does not provide sufficient impairment information to construct an accurate impairment matrix, multi-slot filtering of the impairments is generally employed. However, in faster-changing mobility scenarios, the multi-path environment changes so quickly that impairment matrix filtering actually degrades the performance of the impairment estimation in these receivers. Therefore, this approach is best limited to lower speeds, e.g., up to 10 km/h, depending on the multi-path profile and signal strength.

In another approach, e.g., the convolutional parametric GRAKE approach, impairment matrices are computed directly, using convolution of the received net channel responses. This approach is discussed in co-pending U.S. patent application Ser. No. 12/052,042, titled "Interpolating G-Rake With Two Step Delay Hypothesis Testing" and filed 20 Mar. 2008, the entire contents of which are incorporated by reference herein. This method is capable of providing more accurate channel estimation in faster changing circumstances, thus improving mobility performance compared to non-parametric GRAKE method. However, this approach also suffers performance degradation when filtering of channel estimates is not possible, e.g., at very high speeds. This problem becomes even more significant as more paths are present in the multi-path profile, with each additional path contributing more inter-symbol interference (ISI) to the fingers. Consequently, channel estimation becomes less accurate in these situations.

SUMMARY

The methods and apparatus disclosed herein facilitate an accurate estimation of the timing offsets, relative to a receiver processing delay, for two paths of a multi-path response that are so close together that they are indistinguishable to a typical path searcher algorithm. This accurate estimation of the timing offsets is based, in some embodiments of the invention, on a comparison of long-term average channel coefficient magnitudes to an analytically obtained model for a dual-path response. These accurate timing offset estimates may in turn be used to calculate complex channel coefficients on a slot-by-slot basis.

Accordingly, several embodiments of the invention comprise a method of estimating a propagation channel response experienced by a received signal in a wireless communication receiver, while other embodiments comprise corresponding wireless receivers configured to carry out the methods and processes disclosed herein. Although described herein primarily in the context of a GRAKE receiver, those skilled in the art will appreciate the applicability of the inventive techniques to other receiver configurations, such as those based on the well known chip-level equalizer architecture or other equalization techniques. Thus, an exemplary method according to some embodiments of the invention include the steps of selecting a plurality of receiver processing delays for sampling the received signal so that that the receiver processing delays span two closely spaced channel response delays, and calculating an average channel coefficient magnitude over at least a first number of time slots of the received signal, for each of the receiver processing delays. The exemplary method further include the steps of estimating delay timing for each of the two channel response delays, based on the average channel coefficient magnitudes and a multi-delay superposition model for the channel response, and calculating complex channel gains for each of the two channel response delays, based on the estimated delay timings and channel response measurements taken over a second number of time slots that is less than the first number of time slots.

The first number of time slots may be greater than 50, in some embodiments, and may be as high as 500, or even greater, in some. In some embodiments, the number of slots used for this averaging process may be dynamically selected, based on a current estimated speed of the wireless communication receiver. In several embodiments the complex channel gains are calculated on a per-slot basis, based on channel response measurements taken for a single slot, while in others the complex channel gains may be based on channel response measurements taken and filtered over several slots, such as 10.

Wireless receiver apparatus corresponding to the above methods, and variations thereof, are also disclosed. Of course, the present invention is not limited to the above examples; all variations falling within the scope of the appended claims are intended to be embraced therein.

DETAILED DESCRIPTION

The present invention relates to methods and apparatus for estimating propagation channel responses corresponding to a received signal in a wireless communication receiver such as a RAKE receiver. In particular, the techniques disclosed herein facilitate an accurate estimation of the timing offsets, relative to a RAKE finger, for two paths of a multi-path response that are so close together that they may be indistinguishable to a typical path searcher algorithm. This accurate estimation of the timing offsets is based, in some embodiments of the invention, on a comparison of long-term average channel coefficient magnitudes to an analytically obtained model for a dual-path response. These accurate timing offset estimates may in turn be used to calculate complex channel coefficients on a slot-by-slot basis.

As used herein, the term RAKE receiver encompasses the generalized RAKE (G-RAKE) receiver as described in U.S. Pat. No. 6,363,104, the entire contents of which are incorporated herein by reference. Various embodiments of the invention disclosed herein have application to single-input single-output (SISO) receivers, multiple-input, single-output (MISO) receivers, single-input, multiple-output (SIMO) receivers, and multiple-input, multiple-output (MIMO) receivers. Furthermore, those skilled in the art will appreciate that several of the inventive techniques described below may be applied to a chip-level (or other type) equalizer receiver, despite their descriptions herein in the context of a RAKE receiver.

Figure 1:
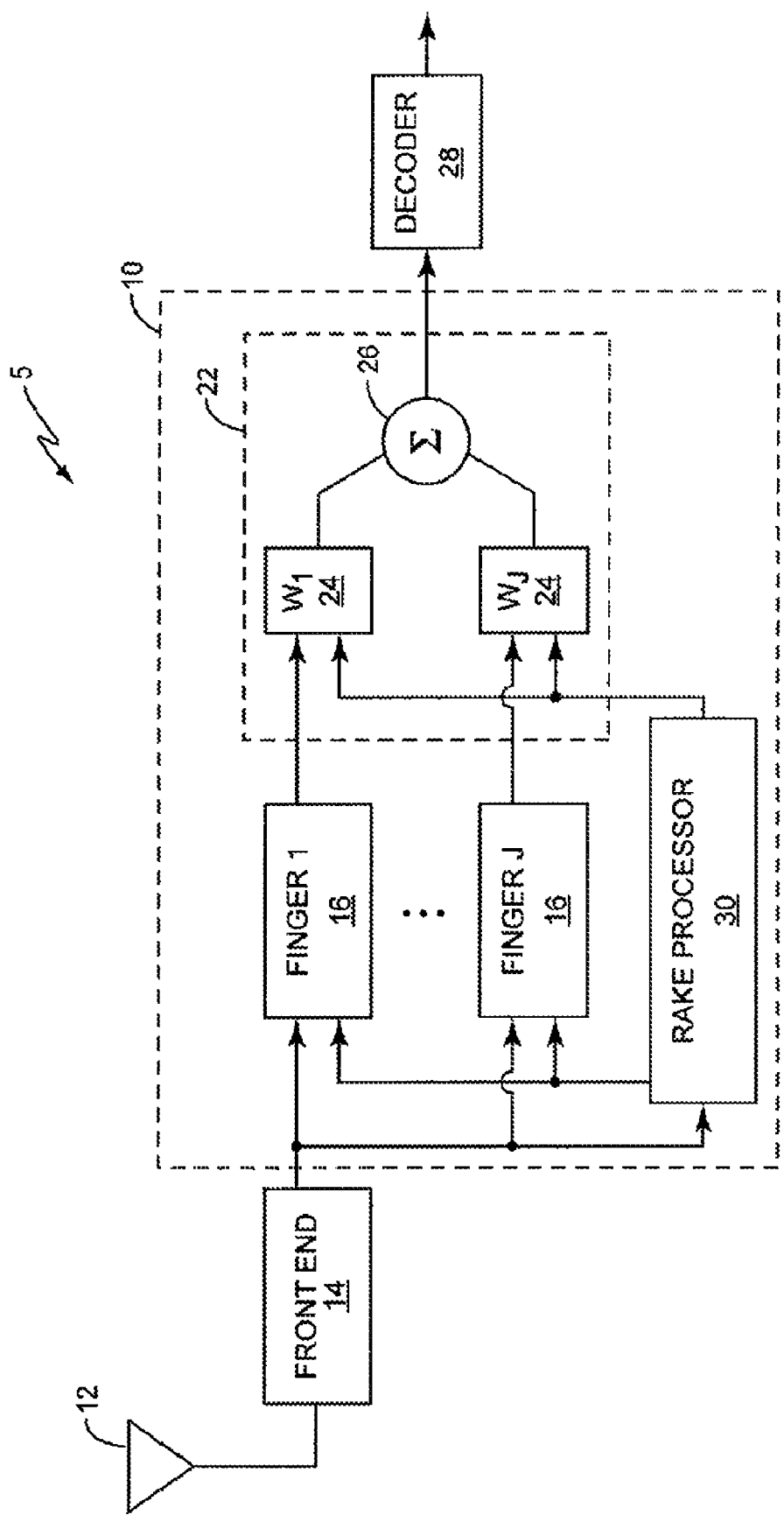
FIG. 1 illustrates a wireless receiver including a RAKE receiver according to one exemplary embodiment of the invention.

FIG. 1 illustrates a wireless receiver 5, including a RAKE receiver 10, according to one exemplary embodiment of the invention. Wireless receiver 5 comprises a receive antenna 12, a receiver front-end 14, a RAKE receiver 10, and a decoder 28. Receiver front-end 14 filters, down-converts, and samples the received signal from antenna 12 to generate a baseband signal for processing. The sampling interval may be one-half the chip period $T_c$, for example. The signal samples from the receiver front-end 14 are input to RAKE receiver 10, which comprises a RAKE processor 30 and a plurality of RAKE fingers 16 to de-spread selected signal images. In the case of a conventional RAKE receiver, L RAKE fingers 16 are typically assigned to the L strongest signal images, and a weighting network 22 is used to combine the outputs of the RAKE fingers 16 to generate a combined RAKE output signal. A GRAKE receiver, on the other hand, typically includes J>L fingers, with all J fingers used for interference cancellation and/or interpolation. In either case, decoder 28 decodes the combined RAKE output signal.

Figure 2:
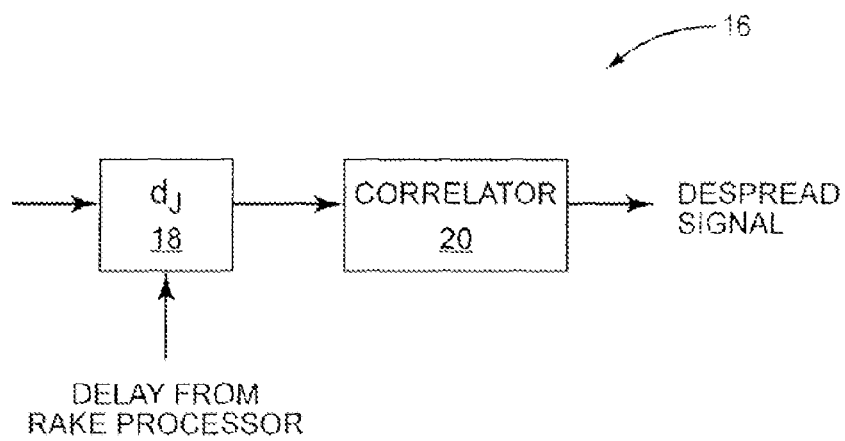
FIG. 2 illustrates a RAKE finger for a RAKE receiver.

FIG. 2 illustrates details of an exemplary RAKE finger 16. RAKE finger 16 comprises a delay element 18 and a correlator 20. The delay element 18 aligns finger 16 with a selected signal image by delaying the received signal by a configurable delay determined by the RAKE processor 30. The correlator 20 correlates the delayed signal with a known spreading sequence associated with a desired signal to de-spread the received signal. As a result of the correlation process, unwanted signals contained in the received signal are averaged out, and appear as noise to the receiver. Weighting network 22 (in FIG. 1) weights and combines the de-spread signals output from the individual RAKE fingers 16. Weighting elements 24 apply a weighting coefficient to respective RAKE finger outputs, and RAKE combiner 26 combines the weighted RAKE output signals to generate a combined decision statistic, referred to herein as the RAKE output signal. The RAKE output signal is applied to decoder 28, which decodes the RAKE output signal to generate an estimate of the originally transmitted signal.

Figure 4:
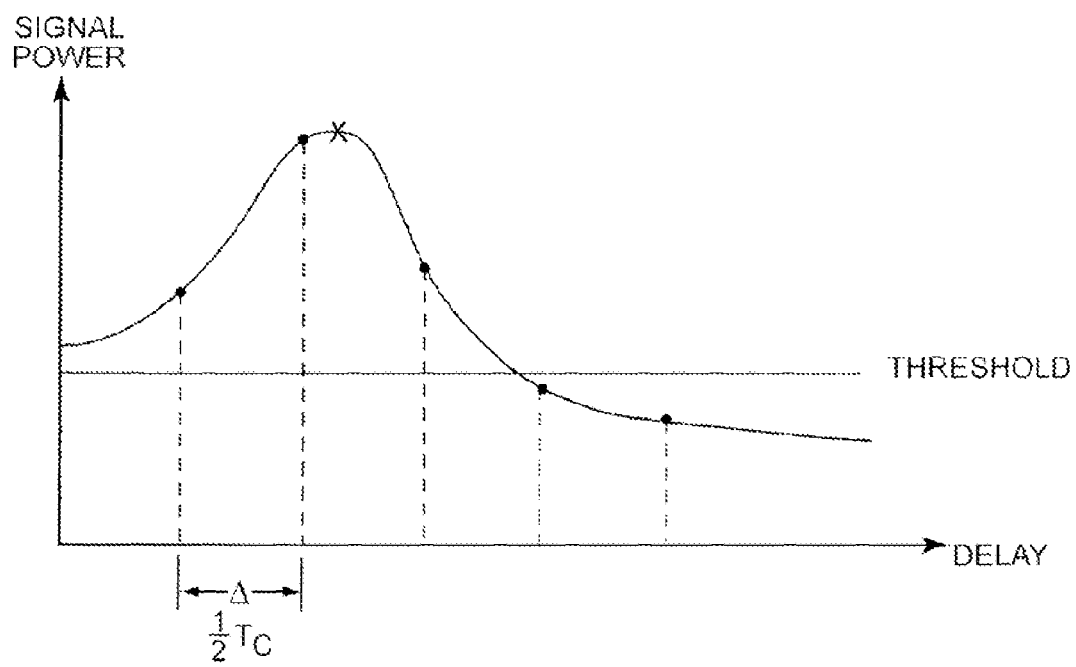
FIG. 4 illustrates an exemplary power delay profile used by a path searcher of a RAKE receiver to identify signal images in a received signal.
Figure 3:
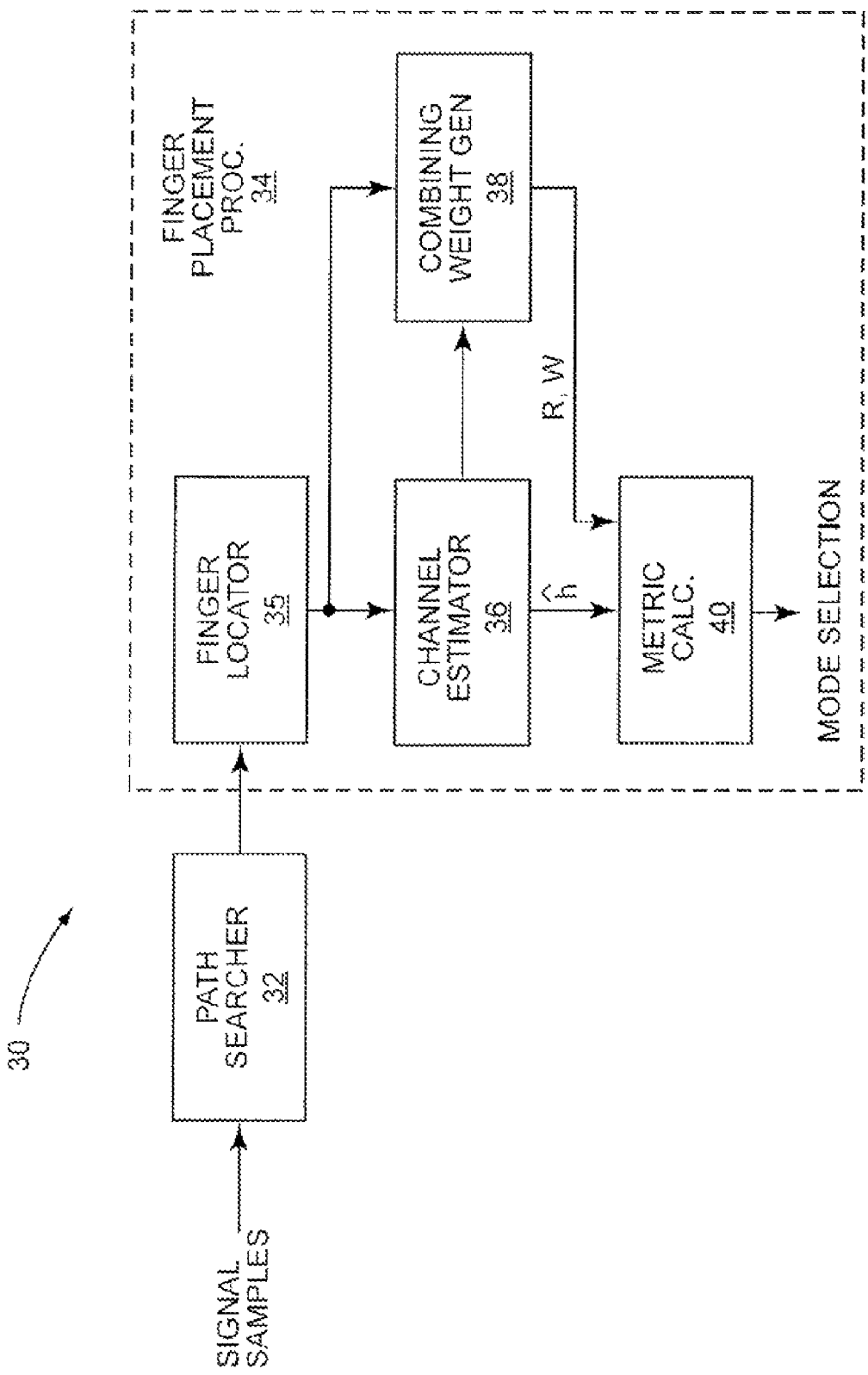
FIG. 3 illustrates a RAKE processor.

RAKE processor 30 determines the number and placement of the RAKE fingers 16 and the combining weights applied to the individual RAKE finger outputs by weighting elements 24. FIG. 3 illustrates a RAKE processor 30 according to one exemplary embodiment of the invention. RAKE processor 30 comprises a path searcher 32 and finger placement processor 34. Path searcher 32 identifies the individual signal images in a received signal and determines the delay associated with each signal image. More particularly, the path searcher 32 generates a power delay profile (PDP), such as shown in FIG. 4, by measuring the signal power of the received signal samples over a predetermined search window. The sampling interval may be one chip period or less. FIG. 4 illustrates a PDP assuming a one-half chip interval ($½T_c$) between signal samples.

One approach to detecting the signal images detects local maxima in the PDP and compares the local maxima to a defined threshold. The delays of these local maxima are taken as the path delays of the signal images in the received multi-path signal. The path delays of the detected signal images are input to the finger placement processor 34, which determines the number and placement of RAKE fingers 16 based on the path delay estimates provided by the path searcher 32. Additionally, the finger placement processor 34 calculates weighting coefficients to be applied to the individual RAKE finger outputs by weighting elements 24. Finger placement processor 34 thus includes a finger locator 35, channel estimator 36, combining weight generator 38, and metric calculator 40. The finger locator 35 determines the locations of the RAKE fingers 16 based on the estimated path delays reported by the path searcher 32. As noted above, In a conventional RAKE receiver, a RAKE finger 16 is typically assigned to the L strongest delays. In a G-RAKE receiver, however, additional RAKE fingers 16 are placed around (before and after) the delays.

In any event, the channel estimator 36 generates estimates of the propagation channel between the transmitter and the receiver 5, for each assigned RAKE finger 16. These channel estimates are provided to the combining weight generator 38, which computes the combining weights applied to the RAKE finger outputs. The combining weight generator 38 may compute combining weights based on a maximal ratio combining (MRC) criteria, for example. For MRC combining, the combining weights are based upon the signal power or signal power to interference power ratio (SIR) at the output of the correlator 20 for each RAKE finger 16. If the SIR for a particular RAKE finger 16 is low, it will be assigned a low weighting factor. Conversely, if the SIR for a particular RAKE finger 16 is high, it will be assigned a large weighting factor. With full G-RAKE combining, the combining weight generator 38 computes impairment correlations across the RAKE fingers 16 and generates an impairment covariance matrix R. The combining weight generator 38 multiplies the vector of channel estimates ĥ from the channel estimator 36 by the inverse of the impairment covariance matrix R to generate a weight vector w, whose elements are the weighting factors for the outputs of RAKE fingers 16.

The performance of a G-RAKE receiver depends strongly on the accuracy of the estimation processes used to determine the covariance matrix R and/or the channel estimates $\hat{h}$. As noted earlier, several conventional approaches to estimating these parameters rely on averaging measurements or estimates of $\hat{h}$ obtained from the received signal over a number of successive time slots. However, these approaches may suffer serious degradations in performance in high-mobility scenarios.

One alternative to the impairment estimation approaches described above, i.e., the non-parametric GRAKE approach and the convolutional parametric GRAKE approach, is an enhanced conventional parametric GRAKE approach, extended to handle multi-path scenarios. In general, this enhanced conventional parametric approach has a strong advantage of being able to accurately compute channel impairment matrix in every slot provided that channel multi-path timings and gains are calculated with sufficient accuracy. Based on this knowledge, an accurate impairment matrix can be computed. While impairment matrix modeling is generally quite mathematically complex, various approaches may be used to reduce the computational complexity.

This enhanced conventional parametric approach is easily deployed in dominant or single-path scenarios, where single-path tracing poses no difficulties. However, this approach is more difficult to adapt to environments with more complex multi-path profiles, where the receiver must follow quickly changing path gains. Especially if channel paths are closely spaced, individual path delay and gain estimation is hampered by superposition of the convolved pulses corresponding to each path. Because of the fast and independent phase rotations for each path in mobile scenarios, the overall shape of the channel response (pulse convolved with instantaneous multipath profile) changes quickly in areas of the multi-path profile where two or more paths have delays that are close to one another.

Some approaches to solving this problem are based on the use of a two-dimensional grid of timing offset hypotheses, where various hypothetical combinations of the two paths are tested. A set of complex channel gains $(g_1, g_2)$ is first calculated for each hypothetical timing offset combination $(\tau_1, \tau_2)$, based on instantaneous (per-slot) measurements of the net channel response at each finger and the combined transmitter/receiver pulse filter response. The complex channel gains $(g_1, g_2)$ are then used to produce a set of hypothetical net channel coefficients $\hat{h}$ corresponding to each timing offset combination. Then, the combination of timing offsets that minimizes the error metric $\epsilon = (\tilde{h} - \hat{h})^H \cdot (\tilde{h} - \hat{h})$ in the mean-squared error (MSE) sense is selected. $\tilde{h}$ are measured, per-slot net channel coefficients as shown in Equation (1), below.

This approach however, has several disadvantages under some circumstances. A first problem arises from the inaccuracy of the per-slot estimate of the net channel response $\tilde{h}$. Due to noise and inter-symbol interference (ISI) from other paths of the multi-path channel, the instantaneous per-slot $\tilde{h}$ estimate is inaccurate. Additionally in multi-antenna scenarios, such as multiple-input, multi-output (MIMO) modes, there are additional ISI effects arising from the simultaneous transmission of two streams. In any case, one slot is not sufficient to provide enough of an averaging period to produce accurate net channel coefficients. However, heavy multi-slot filtering is not possible in this method, because path gain magnitudes and phases can change very rapidly between slots in high-mobility scenarios.

Another problem arises from the receiver's inability to converge to true path timings using this two-dimensional hypothesis testing approach. Even if accurate net channel response estimates were hypothetically available, the MSE algorithm used to solve for the complex channel gains $(g_1, g_2)$ that minimize the $\tilde{h}$-to-$\hat{h}$ error metric occasionally converges on channel gain combinations corresponding to false timing offset hypotheses, because these false timing offset combinations may have a smaller corresponding error metric than the true offset combinations. The main reason for this problem is that the receiver algorithm has too much freedom in the selection of too many parameters to find a solution that is correct in a mathematical sense, but not necessarily correct in the physical sense. Modeling of such algorithms has demonstrated that various channel conditions can yield large areas corresponding to low "error" metric in the two-dimensional grid of hypotheses. These areas are often very wide, have no sharp minimum, and tend to change hugely in subsequent slots. Under these circumstances, true path timing locations cannot be determined.

The techniques presented herein allow for accurate path and timing tracking even in multi-path environments with significant mobility. A strength of some of the inventive techniques disclosed herein is an ability to separate two closely-spaced and overlapping channel paths.

In typical multi-path channel models, there may be a number of sub-paths present, e.g., as many as five or six. However, most paths are far apart from each other in these models. For example, the "Pedestrian B" channel model, widely used for research of mobile communication systems, involves the sub-path distribution shown in Table 1.

TABLE 1

| Path # | 1 | 2 | 3 | 4 | 5 | 6 |
|---|---|---|---|---|---|---|
| Path position (chips) | 0.0 | 0.768 | 3.072 | 4.608 | 8.83 | 14.21 |
| Path strength (dB) | 0.0 | −0.9 | −4.9 | −8.0 | −7.8 | −23.9 |

In the Pedestrian B model, all sub-paths are separated from each other by more than 1.5 chips, except for dominant sub-paths 1 and 2. Because of their larger separations, paths 3, 4, 5, and 6 have net channel responses that are only marginally overlapping—thus these paths can be effectively tracked separately, using conventional single-path parametric techniques. While paths 3-6 can be treated separately, the main effect on each individual path will be increased inter-symbol interference coming from other paths, which decreases the accuracy of instantaneous gain estimates (path timing estimate will not be that much affected as heavy filtering can be used for timing offset estimation). In the case of path gains, instantaneous per-slot value is generally required, although some filtering of gains may also be possible at slower speeds.

An entirely different approach is required for paths 1 and 2. Because the conventional hypothesis-based approach is ineffective at dealing with two closely spaced paths, as discussed earlier, a new technique is proposed herein. This approach is capable of handling and separating two closely spaced paths. In short, this approach exploits the fact that path timing is nearly static, even in fast mobility scenarios, while the path gains change rapidly. Therefore, in a first step, path timing calculation is based on a long-term averaging of finger energy as well as multi-path response modeling of a two-path channel (using a hypothesis-based approach). In a second step, when timing delays for all paths have been determined, complex instantaneous gains are calculated based on immediate (measured) net channel responses. As the presence of more than two strong and very closely spaced paths is less likely, and as most channels can be represented as a collection of separated single or dual-paths, the presented method should be able to cover nearly all circumstances.

Given these improved techniques for estimating the channel response, the performance of several receiver processing techniques can be improved, including cancellation of interference caused by a non-orthogonal synchronization channel (SCH), Doppler estimation, and finger positioning algorithms. Each of these receiver functions, and others, can benefit from detailed path and gain knowledge, improving the overall receiver performance.

Figure 5A:
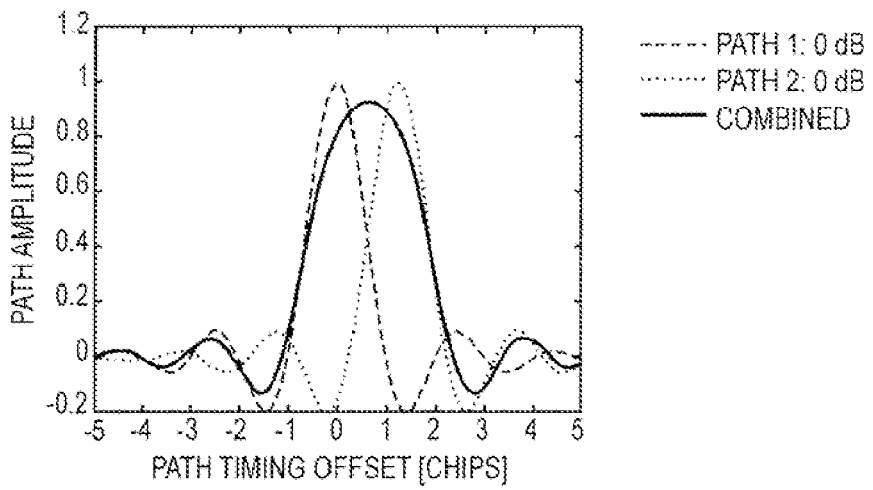
FIGS. 5A, 5B, and 5C illustrate the combining of two closely spaced signal pulses.

FIGS. 5A-5C and FIGS. 6A-6C illustrate characteristic profiles corresponding to the single-slot composite response for a pulse received from two closely separated paths. In FIG. 5A, the first and second paths are separated by only 1.25 chips, and the path gains for each are identical. At any given instant, the two received pulses will add together with random relative phases, so that the composite response may differ dramatically from one slot to another. Those skilled in the art will appreciate that the two pulses are not readily distinguishable in the composite response. However, the shape of the composite response nevertheless provides information about the relative timing of the two paths.

Figure 5B:
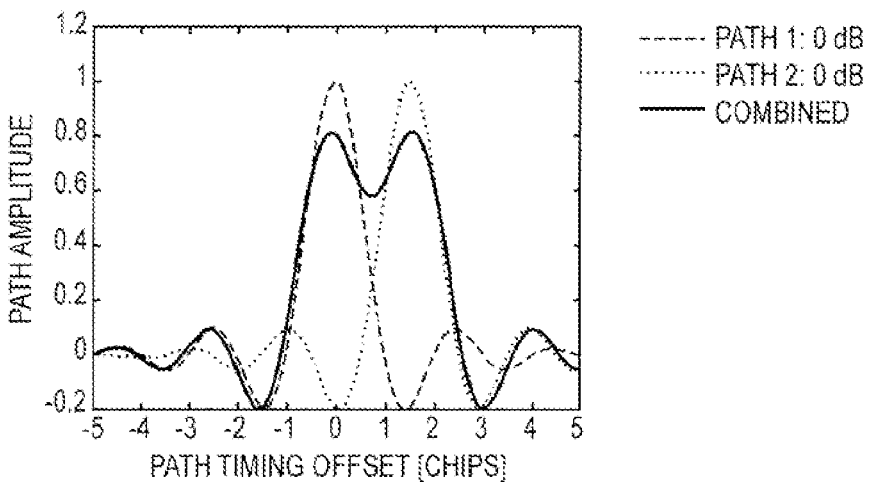
Figure 5C:
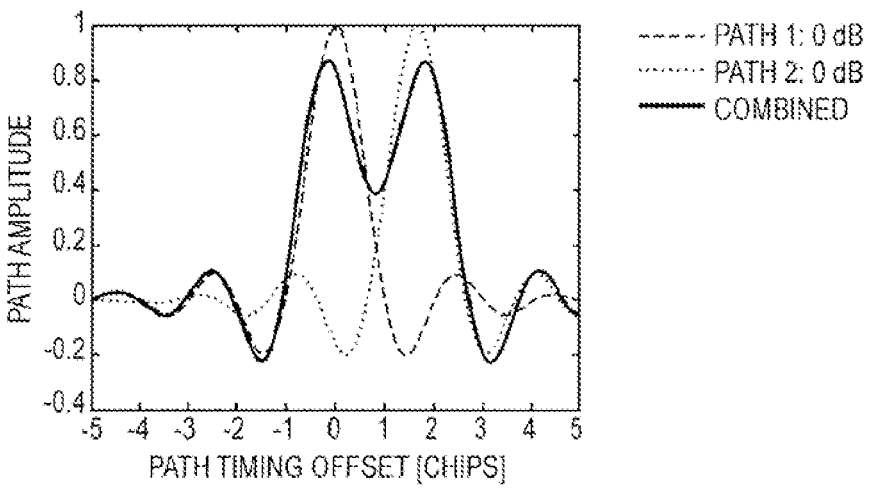

FIGS. 5B and 5C illustrate corresponding characteristic profiles for paths separated by 1.5 and 1.65 chips, respectively. In both cases the path gains for each path are identical. In each of these figures, the two paths are very distinguishable, although it is apparent that the two peaks in the composite response are not aligned perfectly with the underlying path delays. Those skilled in the art will thus appreciate that comparing a measured profile to an analytically derived two-path model can yield improved accuracy in the delay estimation, compared to simply detecting local peaks.

Figure 6A:
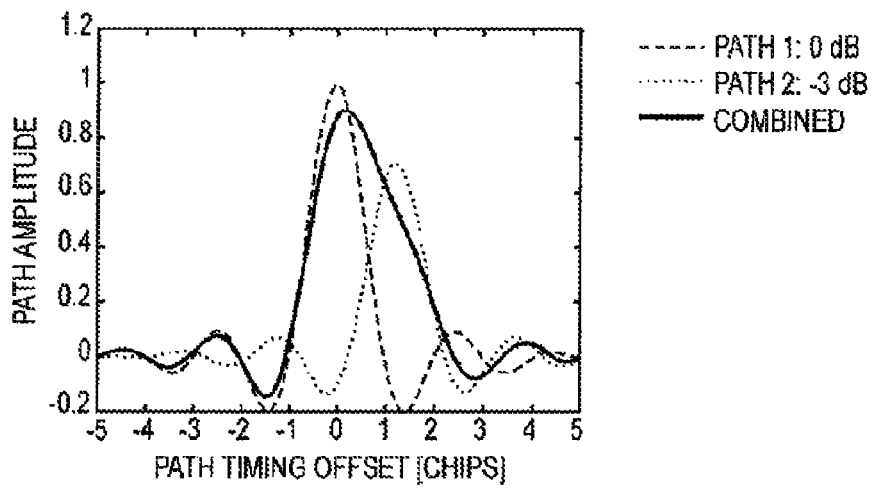
FIGS. 6A, 6B, and 6C illustrate the combining of two closely spaced signal pulses having different amplitudes.
Figure 6B:
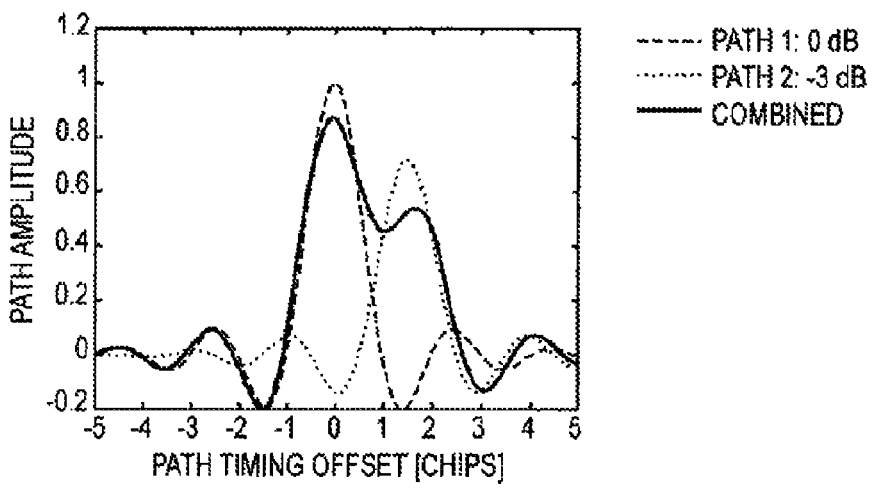
Figure 6C:
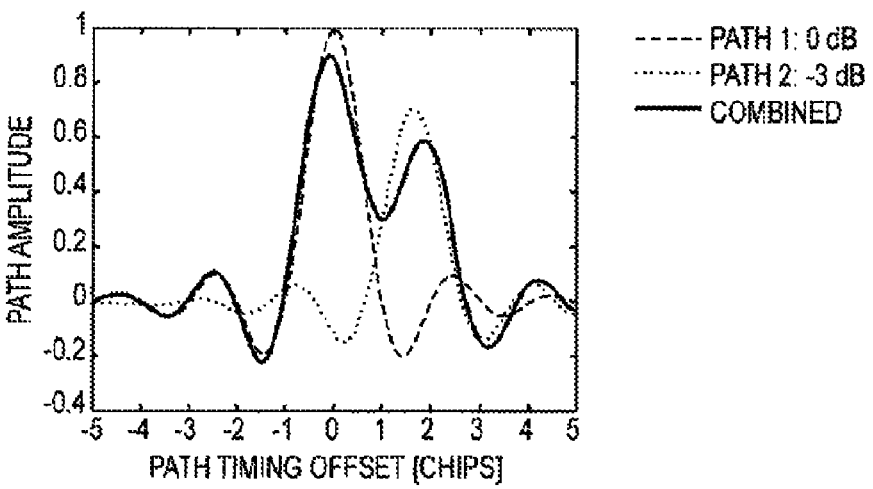

FIGS. 6A, 6B, and 6C provide additional examples of composite responses. In FIG. 6A, the two paths are again separated by 1.25 chips, as was the case for FIG. 5A. However, in FIG. 6A the path gains differ by 3 dB, causing a distinctly different profile than that observed in FIG. 5A. Similarly, FIGS. 6B and 6C illustrate composite responses corresponding to 1.5-chip separation and 1.65-chip separation, respectively, also with 3 dB differences in path gain between the two paths.

An interesting aspect of the composite responses illustrated in FIGS. 5A-5C and FIGS. 6A-6C is that their characteristic shapes are more sensitive to differences in timing than to small changes in path gain. However, as discussed above, relative time differences between paths in a given multi-path environment change relatively slowly, even in high-mobility scenarios. Thus, a composite two-path response obtained by averaging the energy received at several fingers over hundreds of slots can be used to obtain an accurate estimate of the timing offsets between each of the two paths and the receiver processing delay corresponding to that finger. As will be discussed, in more detail below, these accurate timing offset estimates may then be used to calculate improved slot-by-slot estimates of the channel coefficients, based on instantaneous (i.e., per-slot) measurements of the channel response.

Despite its limitations, the path searcher results, while recognized to be inaccurate, are the starting point for this process. As is well known to those skilled in the art, the path searcher reports a number of paths, along with an estimate of the strength of each. Typically, only a limited number of the strongest paths are considered. In G-RAKE, generally, each of the considered paths is "covered" by a grid of fingers, sampling areas before and after the reported paths. Typically, at least 3-4 fingers per path are required—however, paths which are relatively close to each other can share one or more fingers. For example, considering the Pedestrian B model of Table 1, four fingers could be used to cover the area around paths 1 and 2, an additional four fingers used for paths 3 and 4, and three fingers used for each remaining path. Since path 6 is very weak, it could be ignored, if finger resources are limited.

Given N strongest reported paths, the first step is to determine whether the reported paths each correspond to a true single-path response, or whether a reported path actually corresponds to two close paths (dual-paths) which were not distinguished by the path searcher. Depending on the single- or dual-path status of a given reported path, different timing tracking parameters are used.

One way to distinguish between a single-path and a dual-path response is by modeling the response corresponding to a reported (or calculated) propagation response delay using a single-path conventional parametric modeling approach. If the path is truly a single path, then the error calculated with this method will be consistently low over a series of subsequent slots, as the algorithm will be able to find both the fixed path timing and path gains that minimize the error. The error metric can be defined as: $\epsilon = (\tilde{h} - \hat{h})^H \cdot (\tilde{h} - \hat{h})$, where $\hat{h}$ are received instantaneous net channel coefficients, and $\tilde{h}$ are net channel coefficients calculated by the parametric method. For a W-COMA slot, the instantaneous net channel coefficients may be measured from pilot symbols according to:

$$\hat{h}(s) = \frac{1}{10} \sum_{m=0}^{9} x(m) \cdot s^H(m) = \frac{1}{10} \sum_{m=0}^{9} h(m), \quad (1)$$

where x(m) is the de-spread pilot symbol vector (one element for each finger) and s(m) is the pilot symbol sequence (e.g., the CPICH sequence in W-CDMA).

If the path reported by the path searcher actually comprises two separate paths, the individual responses for each path will add and subtract together at relative phases that vary significantly from slot to slot, making single path modeling in some slots very inaccurate. This will result in significantly fluctuating errors in subsequent slots, depending on the instantaneous phases of the sub-paths. The level of single-path modeling fluctuating error can be used as the criteria for determining the presence of the second path, as larger fluctuations indicate that two (or more) closely spaced paths are likely present, rather than a single path. Of course, it is possible that even where two or more closely spaced multiple paths exist, all but one of the paths could be relatively weak, compared to the dominant path. In this case, the additional paths might be effectively ignored, and single path modeling used instead of a more complex dual-path model. Accordingly, a threshold should be applied to the analysis of the fluctuation for making a final decision as to the existence of multiple, closely spaced paths.

Figure 8:
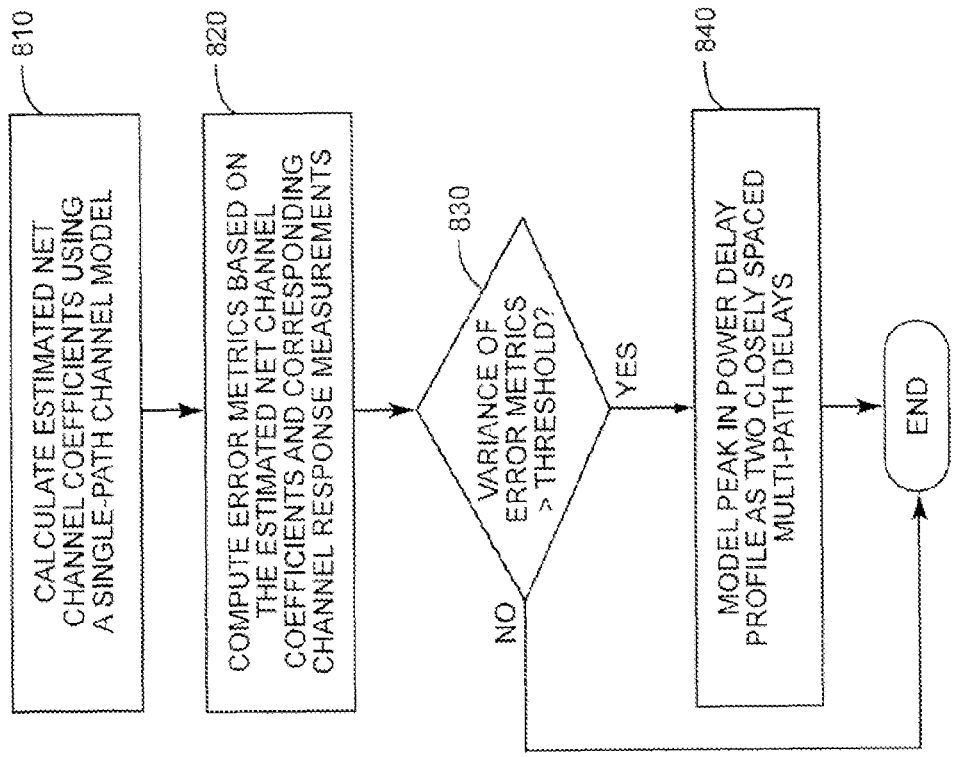
FIG. 8 illustrates an exemplary method of detecting the presence of two closely spaced multipath delays in a propagation channel response.

FIG. 8 is a process flow diagram illustrating an exemplary implementation of the above-described technique for evaluating the propagation channel response to detect the presence of two closely spaced paths corresponding to a single path reported by a path searcher. As shown at block 810, the process begins with the calculation of estimated net channel coefficients using a single-path channel model for the reported path. As noted above, this can be performed using conventional parametric modeling techniques, such as those illustrated in co-pending U.S. patent application Ser. No. 12/052,042, which was incorporated by reference above.

Next, as shown at block 820, the estimated net channel coefficients are compared with corresponding channel response measurements, e.g., measurements performed according to Equation (1), to determine an error metric for each of several successive slots. Then, as shown at block 830, a variance of these error metrics is computed and compared to a pre-determined threshold. The threshold may be determined, for example, from simulated or measured performance of a receiver design, and is generally intended to discriminate between dual-path scenarios where special treatment of the two separate paths is necessary or desirable, on the one hand, and single-path scenarios or dual-path scenarios where one path can be safely ignored, on the other hand.

As noted above, the existence of large fluctuations in the error metric across a number of successive slots (as indicated by a large variance) is evidence of two (or more) closely spaced paths, rather than the single path reported by the path searcher. Thus, if the variance of the error metrics exceeds the threshold, then the peak in the power delay profile reported by the path searcher is modeled as two closely spaced multi-path delays, as shown at block 840. Otherwise, the peak is treated as it was reported, i.e., as a peak corresponding to a single path.

As discussed above, one problem with the conventional parametric method of multi-path timing estimation is that it relies on instantaneous per-slot data. This is a basic requirement because phase changes in mobility scenarios are very quick. Thus, instantaneous per-slot and per-path gain and phase estimates are required to accurately model the channel state for a particular slot. However, single-slot data may be inaccurate, as discussed above, due to noise and ISI effects. Furthermore, as noted earlier, these inaccuracies may be particularly acute under strong multi-path conditions and/or when MIMO is used. Finally, because conventional timing estimation approaches optimize too many parameters, false minima may result under the closely spaced path scenarios described herein. Therefore, standard methods do not adequately allow for tracking of multiple paths.

To address some of these concerns, some embodiments of the present invention use a multi-step approach, where initially only the path timings/delays, but not the path gains, are estimated based on (relatively) long-term averaging of measured channel coefficients. The measured channel coefficients are obtained for all fingers after de-spreading the received signal with the CPICH code sequence. Basically, this approach exploits the statistical properties of the combined two-path response, permitting more accurate calculation of the path timings.

In a first step, a long-term average of channel coefficient magnitudes is calculated for each of L fingers. Thus, a vector of averages may be defined as follows:

$$\hat{h}_{av} = [\hat{h}_{av,1}, \ldots, \hat{h}_{av,L-1}]^T \quad (2)$$

where each element is defined as a mean absolute channel coefficient value:

$$\hat{h}_{av,\ell} = \frac{1}{N} \sum_{m=-N+1}^{0} |\hat{h}_{\ell}(m)| \quad (3)$$

In Equation (3), N is the averaging period in slots. The optimum averaging period depends on channel variability in time. In some scenarios, an appropriate value for N may be several hundred slots (N=300 slots corresponds to about 0.2 seconds); with faster mobility, averaging can be reduced, perhaps to as low as 50 slots.

During the averaging period, path timing drift is very slow, even at faster speeds, so it can be assumed that all slots used to provide data for the averaging process have practically the same path timing. Alternatively, slow drift, can be extrapolated into the future based on historical drift rate. Table 2 presents timing drift and fading effects at various speeds.

TABLE 2

| Speed (km/h) | Doppler spread (Hz) | Period of shift in timing by one chip | | Fading period | |
|---|---|---|---|---|---|
| | | Time per 1-chip shift (seconds) | Frames per 1-chip shift | Time/fade (milliseconds) | Slots/fade (slots) |
| 3 | 5.6 | 94.8 | 9375 | 179 | 266 |
| 10 | 19 | 28.1 | 2813 | 54 | 80 |
| 50 | 93 | 5.6 | 563 | 11 | 16 |
| 120 | 222 | 2.3 | 234 | 4.5 | 7 |
| 250 | 463 | 1.1 | 113 | 2.2 | 3 |

Once the long-term averages of the channel coefficients corresponding to each finger have been found, the profile formed by those averages is compared to an analytical model of $\hat{h}_{av}$, called $\tilde{h}_{av}$. The averages $\hat{h}_{av}$ represent measured signal energy present at each finger averaged over a long time. If it is assumed that this signal energy includes contributions from two separate paths, then a general multi-delay superposition model accounting for the total energy expected at each finger can be presented as a function of contributing factors:

$$E_{TOT} = (E_1, E_2, E_N, E_{ISI}) \quad (4)$$

where $E_1$, $E_2$ is energy originating from the two considered sub-paths, $E_N$ is due to noise, and $E_{ISI}$ is caused by inter-symbol interference from all the remaining paths, even those placed further away, as well as interference caused by multi-path components of a second data stream (CPICH2/DATA2) in a MIMO scenario.

The effect of each of these components can be readily incorporated into the multi-delay superposition model. For instance, the contribution of the two paths present on a finger, $E_1$, $E_2$, will depend on path distance from that finger. Each individual contributor can be modeled easily based on standard pulse shape of raised cosine function. The contribution to a given finger will also depend on the average gain of each path. A value for $E_N$ may be based on an estimate of the average noise level estimate and included in the model. Further, $E_{ISI}$ could be estimated based on prior or preliminary knowledge of all the remaining paths and their average gains. Alternatively, the average long-term effect of $E_N$ and $E_{ISI}$ together can be measured at each finger in a manner similar to that used in the non-parametric GRAKE, that is, based on the variation of instantaneous channel coefficient compared to averaged channel coefficient (over ten pilots in a slot) at that finger. $E_{ISI}$ could be more significant if strong paths other than those modeled are present, however the contribution from elements $E_1$, $E_2$ is typically the most significant.

The process in general involves the use of a timing hypothesis-testing approach to find the best possible timing offsets of the two paths. The actual number of timing hypotheses tested can be implementation specific. It is possible for example, to use a coarse grid of timing hypotheses initially and then, once approximate path timings are known, switch to a finer grid. However it should be noted, that due to slow timing drift and long term averaging periods, it is not necessary to update the timing offset determination very frequently. As a result, the hypothesis-testing operations can be split into 'chunks,' and spread over tens or even hundreds of slots; where only a small number of hypotheses is tested in each slot, in order to make the processing more balanced. This distributed approach allows for the testing of many more timing hypotheses, and thus permits more flexible monitoring of the channel conditions to detect new signal paths. This could help in locating newly appeared paths even before received information from path searcher.

The core processing for the hypothesis testing is performed in the real, not complex; signal domain, since the calculations are based on averaged per-finger energy and do not include phase dependencies. Instead, statistical models of energy distributions are used. Those skilled in the art will appreciate that ignoring complex phase dependencies between sub-paths allows for substantial reductions in computational complexity.

The instantaneous per-slot net (measured) channel coefficients ĥ are heavily affected by gain and phase differences between the two sub-paths. In some cases, two close sub-paths could completely cancel each other out if their corresponding gains were similar and phases were opposite. Therefore, the combined (two-path) response for a given slot may not resemble individual single-path component responses at all. This is due to pulse shapes of both close paths overlapping and interfering with each other, as well as to the fact that effective (long term averaged) signal amplitude cannot be calculated as simple addition.

To illustrate this, a nearly static case in which both paths have identical gain strength and identical timing offsets may be considered. Given that the relative phases between the two paths change constantly in every slot, over a long term such as hundreds of slots, the two sub-paths in the considered two-path profile add together at various random phases. In some slots the resulting composite response will be an effective pulse shape that is twice as strong as a single pulse, i.e., when the phases for the two received paths are identical. In other slots the response will be null, i.e., when the phases are opposite and the paths have cancelled themselves out.

The techniques discussed herein consider the effective, average, long-term magnitude of the channel response measured at each finger, assuming random phases for the two modeled signal paths. In the example discussed above, in which the channel gains for the two paths are identical, and the delays for the two paths are the same, then the effective long term average effective magnitude will be $\Box 1.27^*g_1$, where $g_1$ is the gain of each individual path. (Those skilled in the art will appreciate that this result is obtained by simply integrating the pulses combined over all possible phases; see Equation (5) below.)

The same general approach applies to the scenario in which the timing offset (relative to a given finger) is slightly different for each of the two paths that combine to form a single peak reported by the path searcher. In that case, each finger will receive different energy from each channel path depending on that path's distance from the finger, according to a pulse-shape sub-path model. However, it is still possible to calculate the average effective magnitude for a given pair of timing offsets, if the ratio of energy contributed from the two sub-paths is known.

When the two paths contribute unequal energies, the effective magnitude must clearly be less than about $1.27^*g_s$, where $g_s$ is the gain of the stronger path. The exact value depends on the ratio of the gains for the two sub-paths, and can be calculated analytically or simulated. An approximate function is presented in Equation (5), where the average channel coefficient magnitude of the two paths superimposing at finger n is given by:

$$\hat{h}_{av,n}(g_1, g_2, \tau_1, \tau_2) = \frac{1}{4\pi^2} \int\int \qquad (5)$$
$$|g_1 \cdot e^{j\varphi_1} \cdot h_n(\tau_1) + g_2 \cdot e^{j\varphi_2} \cdot h_n(\tau_2)|$$
$$d\varphi_1 d\varphi_2$$
$$= \frac{g_1 h_n(\tau_1)}{4\pi^2} \int\int |e^{j\varphi_1}| \cdot$$
$$\left|1 + \frac{g_2}{g_1}\frac{h_n(\tau_2)}{h_n(\tau_1)} \cdot e^{\frac{j(\varphi_2-\varphi_1)}{\phi}}\right| d\varphi_1 d\phi$$
$$= \frac{g_1 h_n(\tau_1)}{2\pi} \int \left|1 + \underbrace{\frac{g_2 h_n(\tau_2)}{g_1 h_n(\tau_1)}}_{v} e^{j\phi}\right| d\phi$$

$$\hat{h}_{av,n}(g_1, v, \tau_1, \tau_2) \approx g_1 h_n(\tau_1)\left(1 + 0.27\left(\frac{v \cdot h_n(\tau_2)}{h_n(\tau_1)}\right)^2\right)$$

$$\text{if } \frac{v \cdot h_n(\tau_2)}{h_n(\tau_1)} < 1$$

where $h_n(\tau_X)$ is the hypothetical (normalized) real-valued pulse-shape response of the sub-path x (x∈[1,2]) at finger n, and $g_X$ is the average gain magnitude of that path. The ratio of channel path gains, v, is unknown initially.

The ratio v of path gains can vary between zero and one, and can have a profound impact on the average effective signal magnitude, as is evident from a close inspection of Equation (5). Various values for v must therefore be tested for each hypothesis of timing offset combinations, to obtain the best match between the measured $\hat{h}_{av}$ and the analytically modeled $\tilde{h}_{av}$. For the discussion that follows, it will be assumed that R+1 hypothetical values for v will be tested, in the range of 0 to 1, with a step size of 1/R. In a practical implementation, R might be equal to 20, for example, although smaller or larger values might be used.

The approximation presented in Equation (5) allows for the efficient calculation of effective channel coefficient magnitude at each finger resulting from the presence of the two close paths. However, the multi-delay superposition model presented above does not include all effects. For example, fading effects will change the statistical magnitude distribution properties of both signals. That will slightly modify the sub-path addition process and Equation (5). Those skilled in the art will appreciate that an exact formula including fading effects can be derived analytically, based on Rayleigh fading models, for example, or simulated. Because these details are not necessary to a full understanding of the present invention, those details are not presented here.

Energy from inter-symbol interference and noise will also have an additional, although smaller effect. Note that ISI and noise will combine in similar, magnitude ratio-dependent way as the paths considered above. In most cases energy from ISI/noise at a given finger will be much lower than the energy contributed by strong signal paths and the ratio of magnitudes will therefore be low—then the effect of ISI/noise can be ignored. Simulations have shown that ignoring fading, ISI and noise effects in modeling (even in the most difficult high noise, high-ISI multi-path MIMO mobility scenarios) results in only marginal inaccuracy of calculated timing estimates.

When the estimation process begins, the receiver does not know the exact path timing offsets or average gains for either of the two paths. The receiver proceeds by testing various timing offset hypothesis. For each hypothesis, comprising a pair of timing offsets, various hypothetical gain ratios between the two sub-paths are tested. Thus, for each timing-offset hypothesis and each path gain ratio v, respective single sub-path signal strengths are calculated at all fingers, based on the summed single-path pulse-shape model and the current value of v. At each finger, the energy from each of the two channel paths will be different. For each hypothesis, the effective magnitude $\tilde{h}_{av,n}(g_1, v, \tau_1, \tau_2)$ for each finger may be calculated according to Equation (5) or a similar expression, any of which may also be updated to include energy contributed due to ISI and noise. This operation needs to be performed independently for each finger, depending on respective channel path gain ratio at that finger.

The final result for a given timing offset hypothesis is R sets of average channel coefficient magnitudes for the fingers, each set corresponding to a value of v. Each of these sets, which effectively comprise predicted response profiles corresponding to the hypothesized timing offsets, is then scaled before a final error metric is calculated, since the analytical model is based on normalized amplitudes of pulse shapes. For each $\tau_1, \tau_2$ timing combination hypothesis, the ratio v corresponding to the best fit between the measured $\hat{h}_{av}$ and the analytically modeled $\tilde{h}_{av}$ is selected.

When each offset timing hypothesis has been evaluated according to the preceding, then an optimal timing estimate of the two paths, i.e., $\check{\tau}_1, \check{\tau}_2$, may be found, based on the minimum error metric criteria. Then, given $\check{\tau}_1, \check{\tau}_2$, an instantaneous complex channel gain for each of the two paths may be calculated for each slot, using the instantaneous $\hat{h}$ computed for each finger as in Equation (1). A conventional mean-squared error approach can be used, minimizing the average square error on available fingers.

Alternatively, an ISI-weighted approach can be used to give preference to stronger fingers with less ISI, for improved accuracy. In all of the methods described above, the error metric is typically calculated as $\epsilon = (\tilde{h} - \hat{h})^H \cdot (\tilde{h} - \hat{h})$. That approach has a potential drawback in that the error on each finger is given an equal weight in the computation of the total error. In reality, fingers more closely aligned to true paths have more accurate h data than those further away, due to the fact that ISI increases further away from true path. For example, if fingers 3 and 4 are closely aligned to actual propagation paths, the error on these fingers will be low. However, the error metric calculation may be dominated by the random ISI present on more distant fingers 1-2 and 5-6, which may result in the receiver choosing a combination of timing and gains that happen to better approximate the random ISI on weak fingers in that particular slot, rather than the true path energy on the strongest fingers.

A "live" ISI estimate on each finger can be computed from:

$$\hat{\Theta} = \sum_{m=0}^{9} (\hat{h} - x(m) \cdot s^H(m)). \tag{6}$$

To include the effect of ISI (and thus, uncertainty) on each finger, it is proposed to include an ISI-based weighting in error metric calculation and to assign more weight to fingers with less ISI. The 'weighted' error metric could then be computed as:

$$\varepsilon_2 = \begin{bmatrix} (\tilde{h}_1 - \hat{h}_1)/|\hat{\Theta}_1| \\ (\tilde{h}_2 - \hat{h}_2)/|\hat{\Theta}_2| \\ \cdots \\ (\tilde{h}_n - \hat{h}_n)/|\hat{\Theta}_n| \end{bmatrix}^H \cdot \begin{bmatrix} (\tilde{h}_1 - \hat{h}_1)/|\hat{\Theta}_1| \\ (\tilde{h}_2 - \hat{h}_2)/|\hat{\Theta}_2| \\ \cdots \\ (\tilde{h}_n - \hat{h}_n)/|\hat{\Theta}_n| \end{bmatrix}. \tag{7}$$

Those skilled in the art will appreciate that other methods for weighting the error metric for ISI may be used.

Those skilled in the art will appreciate that one advantage of the procedures described above is that the timing offset estimation is practically unaffected by instantaneous per-slot ISI or noise, as both are minimized through long time $\hat{h}_{av}$ averaging. Furthermore, very accurate path tracking is made possible even when two paths are close to each other. With previously known techniques, separation of close (and thus interfering paths) was not possible.

The result of the above processing techniques is the availability of accurate path timing offset information which can be used to improve the performance of a number of signal processing algorithms in the receiver. For instance, knowledge of more accurate, immediate, per-slot complex gains gives the advantage of being able to construct the impairment matrix immediately, without any need to filter the impairment over a long time. That would result in significant mobility performance improvement.

Another advantage of the approach described above is that as timing calculations are split and performed over long time (multiple-slots), many more timing hypotheses (even more distant ones) can be evaluated. This provides the additional benefit, under some circumstances and in some embodiments of the invention, of being able to identify and locate newly appeared paths, without prior indication from the path searcher.

Figure 7:
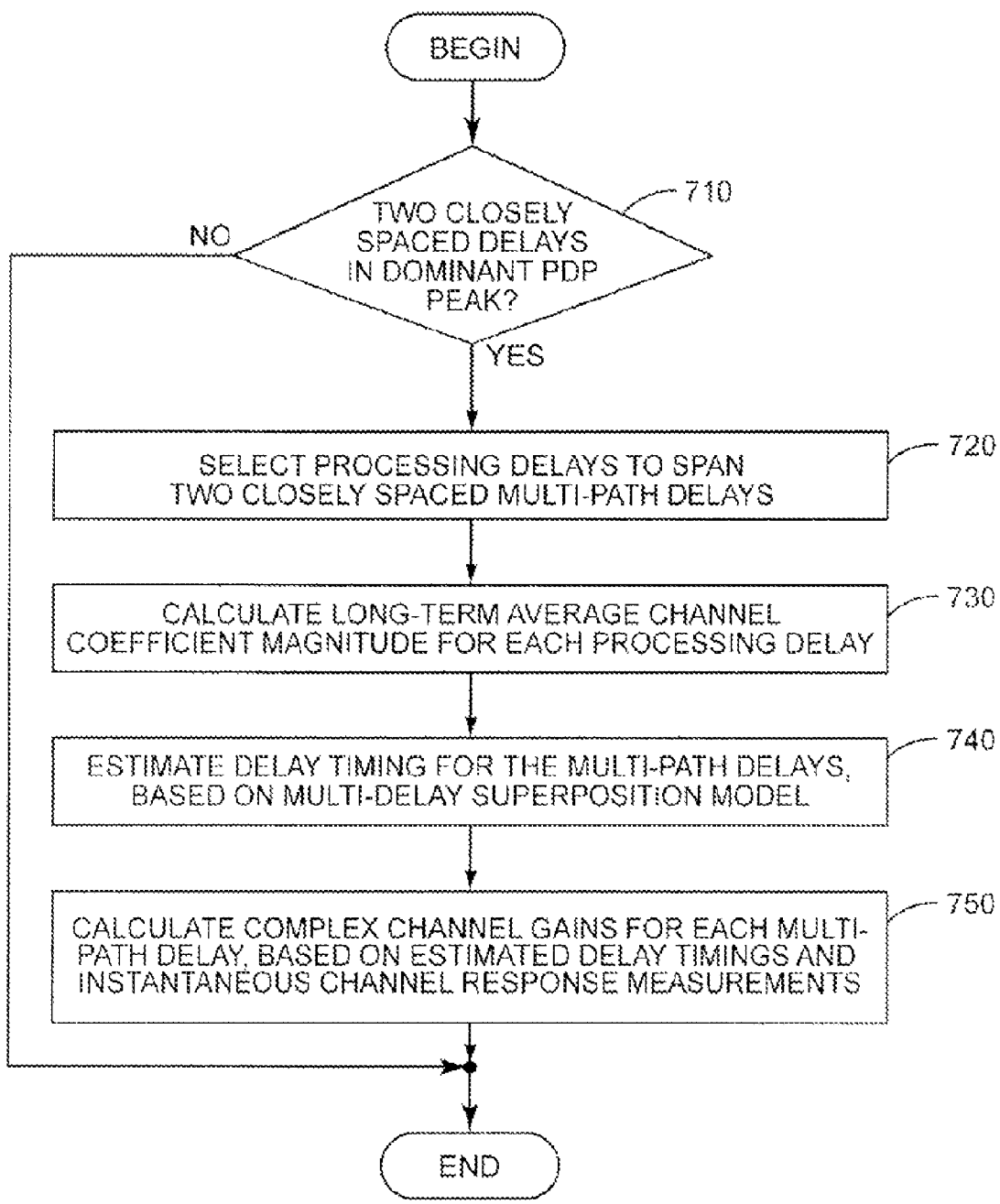
FIG. 7 illustrates an exemplary method of estimating a propagation channel response according to some embodiments of the invention.

FIG. 7 is a process flow diagram illustrating one embodiment of the above-described method for estimating the propagation channel response corresponding to a received signal in a wireless communication receiver. The method begins, as shown at block 710, with a determination of whether there are two closely spaced channel response delays corresponding to a particular power delay profile peak, such as the dominant peak. Various techniques may be used for determining that two paths are contributing to the peak, rather than just one. One approach was described above, with reference to FIG. 8.

If it is determined that the peak under consideration comprises only a single delay, then the procedure "ends," and normal processing of that peak ensues. If there are two closely spaced paths present, on the other hand, then additional procedures are needed to accurately estimate the complex channel gains experienced by the received signal. These procedures begin, as shown at block 720, with the selection of several processing delays to span the two closely spaced multi-path delays. As noted above, in a G-RAKE receiver this involves the placement of a small "grid" of fingers to sample the signal at delays during, shortly before, and shortly after, the peak detected by the path searcher.

As shown at block 730, the energy detected at each of these processing delays is averaged over a relatively long period, such as tens or hundreds of time slots. This results in an average energy profile (albeit with only as many samples as there are fingers allocated for this purpose) that spans the two path delays. This profile can then be evaluated, as shown at block 740, with respect to a multi-delay superposition model, to estimate the delay timing for the multi-path delays.

As discussed above, the multi-delay superposition model accounts for the contributions of energy from the two paths at various timing offsets relative to each finger, and may be used to compute hundreds of hypothesized shapes for the energy profile, each hypothesis corresponding to a given pair of hypothesized path delays relative to the selected receiver processing delays (finger delays). Further, as discussed above, the multi-delay superposition model may also include the calculation of several hypothesized energy profiles for any given hypothesized timing offset pair, each of these corresponding to various path gain ratios between the two paths.

The result of evaluating the measured average channel coefficients against the multi-delay superposition model is an estimated delay timing for each of the two channel response delays. These estimated delay timings may then be used, as shown at block 750, to calculate complex channel gains for each multi-path delay. These complex channel gains are calculated from the estimated delay timings and channel response measurements taken over a relatively short period, e.g., for a single slot, or for a few slots. Accordingly, the complex channel gains will track short-term changes in the channel conditions.

In some embodiments, the number of slots used to calculate the average channel coefficient magnitudes (block 730) may be dynamically selected by the receiver, based on an estimated speed of the wireless communication receiver. Thus, a mobile terminal moving relatively slowly may average the channel coefficient magnitudes over a longer period of time compared to a quickly moving terminal.

As noted above, the detailed processing of FIG. 7 begins with a determination of whether there are actually two overlapping path responses to be analyzed. In some embodiments, this determination begins with the calculation of estimated net channel coefficients for each of several time slots of the received signal, using a single-path channel model for the channel coefficients, such as the single-path parametric model. Then, an error metric is computed for each slot, based on the estimated net channel coefficients and measured channel coefficients taken at each slot. Finally, a variance of the error metrics is computed, and compared to a pre-determined threshold. A variance in excess of the threshold indicates that there is more fluctuation in the error metric than should be expected if the underlying response were actually due to a single path. Thus, a variance in excess of the threshold indicates the presence of two closely spaced channel response delays in the propagation channel response, thus triggering the use of a two-path model for subsequent processing.

Because the relative time offsets for the two closely spaced paths will change relatively slowly, even in high mobility conditions, the hypothesis testing procedures described above can be spread out over time, and need not be performed in a single slot. For instance, the multi-delay superposition model used in a particular embodiment may allow for the calculation of 400 time-offset hypotheses, corresponding to 20 time delays for each of the two paths. For each of these time-offset hypotheses, 20 profiles may be computed, e.g., one for each of 20 different gain ratios between the two paths. This results in a total of 8000 profile computations—because the time offsets are expected to change slowly, these profiles can be calculated and evaluated gradually, over many slots. For instance, the 8000 profile computations of this example might be evaluated over 400 slots, in some embodiments, such that only 200 of these profiles are computed and evaluated in each slot.

Figure 9:
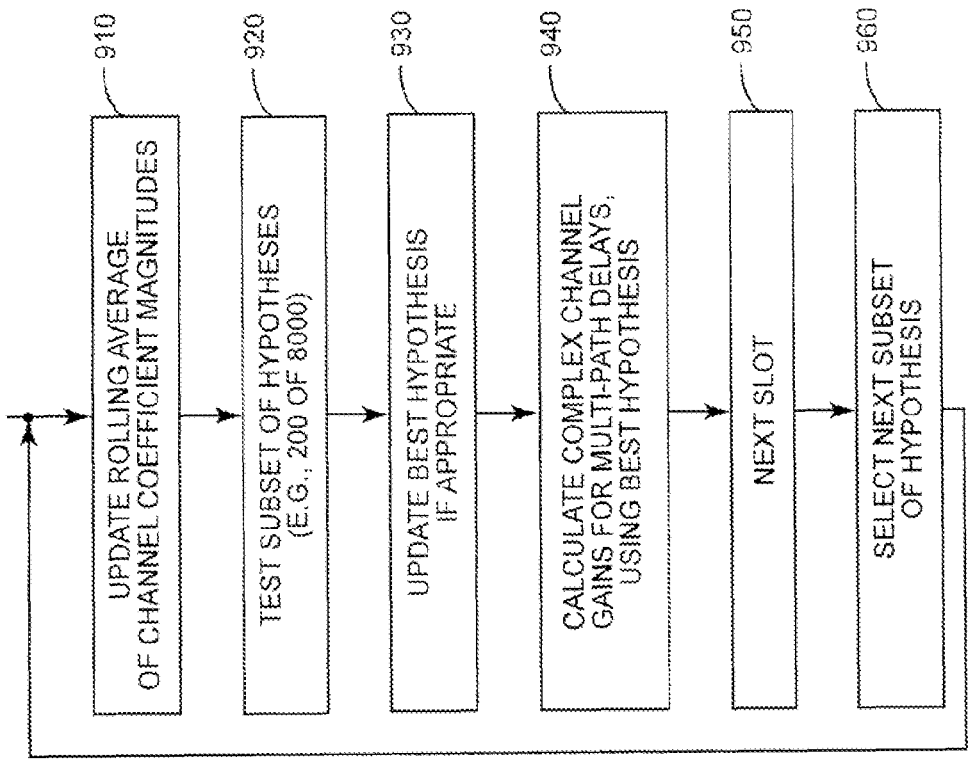
FIG. 9 illustrates an exemplary method for hypothesis testing of multi-path delays and amplitudes, according to some embodiments of the invention.

An exemplary embodiment of a processing method according to this approach is pictured in FIG. 9. FIG. 9 illustrates a single iteration of a process that is generally expected to operate continuously—in particular, FIG. 9 illustrates the processing associated with a single slot. The illustrated processing "begins", for a given slot, with the updating of a rolling average of channel coefficient magnitudes, as shown at block 910. Again, because the timing offsets of the two paths are expected to change relatively slowly, the effective time constant of this rolling average can be tens, or even hundreds, of time slots. For each slot, then, the updating of this rolling average may comprise computing a weighted average of the finger amplitudes measured for the current slot and the previous value of the rolling average. Those skilled in the art will appreciate that the weighting values determine the effective time constant of the averaging process.

Next, as shown at block 920, a subset of the total overall hypotheses are tested. Given the numbers discussed above, for example, 200 of a possible 8000 hypotheses (each hypothesis comprising a hypothesized gain ratio and hypothesized time delays for the two paths) are computed and evaluated.

At block 930, the "best" hypothesis is updated if one of the currently tested hypotheses is a better fit to the most recent averaged channel coefficient profiles than the previous "best" hypothesis. Because the rolling average is changing over time, a previously saved hypothesis should be re-evaluated against the most current rolling average periodically, e.g., at each slot. An error metric computed from this evaluation can be compared to error metrics computed for each of the new hypotheses to determine whether one of the new hypotheses is superior. As noted above, this "fit" may be evaluated under any of several different criteria, such as an MSE criterion or a criterion based on ISI-weighted contributions from each finger.

As shown at block 940, the best hypothesis (whether or not it has been updated in the current slot) is used to calculate complex channel gains for use in subsequent processing of the received data in the current slot. When processing proceeds to the next slot, as shown at block 950, a new subset of hypotheses is selected, and the hypothesis-testing and updating process repeats. Those skilled in the art will appreciate that this processing approach will not only converge on the best available hypothesis for timing offsets for the two delay paths, but will also track variations in those offsets. Indeed, the illustrated process will also "discover" new multi-path delays that are introduced into the delay window spanned by the receiver fingers, as those new delays become significant enough to dominate an earlier tracked delay.

Those skilled in the art will also appreciate that many variants of the process illustrated in FIG. 9 are possible. For instance, although complex channel gains are calculated for each slot in the illustrated process, based on the current "best" hypothesis, the complex channel gains could instead be calculated only after the entire set of hypotheses has been tested, e.g., once after each testing of all 8000 hypotheses. In either case, the testing of the entire range of hypotheses is spread out over multiple slots.

With the above exemplary embodiments in mind, those skilled in the art will appreciate that the techniques disclosed herein broadly provide for a method of estimating a propagation channel response experienced by a received signal in a wireless communication receiver, as well as corresponding wireless receivers configured to carry out the methods and processes disclosed herein. Although described above primarily in the context of a GRAKE receiver, those skilled in the art will appreciate the applicability of the inventive techniques to other receiver configurations, such as those based on the well known chip equalizer architecture. Accordingly, in general terms, various embodiments of the invention include the steps of selecting a plurality of receiver processing delays for sampling the received signal so that that the receiver processing delays span two closely spaced channel response delays, and calculating an average channel coefficient magnitude over at least a first number of time slots of the received signal, for each of the receiver processing delays. This first number of time slots may be greater than 50, in some embodiments, and may be 500 or greater in some of these. In some embodiments, the number of slots used for this averaging process may be dynamically selected, based on a current estimated speed of the wireless communication receiver.

In any event, these various embodiments further include the steps of estimating delay timing for each of the two channel response delays, based on the average channel coefficient magnitudes and a multi-delay superposition model for the channel response, and calculating complex channel gains for each of the two channel response delays, based on the estimated delay timings and channel response measurements taken over a second number of time slots that is less than the first number of time slots. In some embodiments the complex channel gains are calculated on a per-slot basis, based on channel response measurements taken for a single slot, while in others the complex channel gains may be based on channel response measurements taken and filtered over several slots, such as 10.

The improved propagation channel response estimates obtained with the techniques described above may be used in several essential receiver processes, improving the performance of each. For instance, the complex channel gains and corresponding delay timings for the two paths of the multi-delay response can be used in the computation of an impairment covariance matrix R, which may then be used according to known techniques for interference suppression in a G-RAKE receiver.

The improved channel path timings/delays and gains obtained with the techniques described herein may also be used to enhance the accuracy of synchronization channel (SCH) cancellation, which is normally hampered by inaccurate path information. Knowledge of accurate path timing offset and gain magnitude and phase allows for very accurate SCH modeling and subtraction.

Indeed, conventional SCH cancellers work best in (nearly) static dominant-path conditions, identifying dominant paths either based on path searcher results or based on dominant CPICH fingers. Limited information about accurate path timing affects the quality of SCH mirror image calculation. The improved channel path timings/delays and gains obtained with the techniques described herein may be used to allow for extension of conventional SCH cancellation techniques to cover multiple paths. With these extensions, the SCH originating from each path can be removed with much higher accuracy. These extensions will also allow for performing SCH cancellation even during mobility scenario, as the timing and gain for each path and gains are available quickly.

Another use for the improved propagation channel response information obtained with the inventive techniques described above is for Doppler effect estimation. Since the estimation techniques in several of the embodiments described above provide updated channel gain information in every slot, it is possible to use this channel gain information for better Doppler effect estimation. In particular, the Doppler effect can be based on a calculation of a rate of phase change, or based on gain magnitude changes (which are caused by Rayleigh fading). Either of these techniques can provide Doppler effect estimation with greater accuracy than existing methods, given the improved channel response estimation techniques disclosed herein. Additionally, independent Doppler tracking may be provided for each individual path, even for closely spaced paths—those skilled in the art will appreciate that these can be drastically different, depending on multi-path profile. Doppler effect and/or mobile speed, estimated according to the above approach may be used in turn as a parameter in various receiver processes, for example, as one of the criteria for GRAKE method selection.

Finger positioning in WCDMA receivers is typically based on the output from a path-searcher function, which provides location of strongest paths. Fingers are then usually placed around the strongest paths. The default finger placement method, while sufficient for QPSK/QAM16 modes, may not provide optimum finger coverage to support fastest rates, e.g., those rates available with QAM64 modulation and/or multiple-input, multiple-output (MIMO) techniques. There are numerous disadvantages of placing fingers solely based on path searcher indication. First, while the path searcher may provide locations of multiple paths, these are usually only reported if located at some distance away (in time) from the main path. Close secondary paths, even if of similar strength, are usually not reported and not included in finger placement calculation. Second, a path-searcher has limited resolution (typically 0.25-chip), but inaccuracies larger than this have been observed. In some cases, the path searcher may provide a report indicating a path timing that is far as 0.5-0.75 chip away from the true path). Third, the low frequency of path-searcher updates (e.g., ~80 ms) could have serious consequences under some circumstances. For instance, mobility, clock-related drift, and multi-path fading effects can make the dominant path move very quickly. This could result in serious performance degradation or even the inability to receive anything until the next path update is available. Finally, in the event that two close paths (in multi-path profile or coming from two transmitter antennas in MIMO mode) are of similar strengths, the path-searcher based algorithm could jump between the two paths, resulting in frequent finger repositioning operations. This can have consequences for GRAKE processing itself, as some filtered values and matrix elements may need to be flushed at each finger repositioning; this will consequently degrade performance. Additionally, RAKE reprogramming is system-intensive and may take some time. Depending on the system design, this reprogramming could result in other operations being suspended or reduced during that time.

As the inventive techniques disclosed herein provide path timing information with resolution much higher than that of the path searcher, these path timings could be used for optimized finger selection. Furthermore, the GRAKE timing process will lock onto new timing in case of rapid timing change, as long as the new path position is less than 1-2 chips away. Such small timing changes are common in mobility multipath scenarios. Normally, sub-optimal finger placement would result in performance degradation until the new path searcher update becomes available. With the approach disclosed here, finger repositioning can be executed immediately.

Of course, in the case of larger path timing offset changes, it may still be necessary to execute full finger repositioning based on new path searcher results. The techniques disclosed herein can track paths within the window area limited by the number of fingers, while a path searcher covers much larger area. If a new, stronger path appears outside existing finger-covered area, then finger repositioning will be initiated as before, based on path searcher indication. Following that, the techniques disclosed above may be used to "lock onto" the new timing, thus providing means for more accurate finger placement in subsequent slots.

When the non-parametric or convolutional GRAKE methods are executed, exact timings are not required for impairment matrix formation. However, in these situations the enhanced propagation channel estimation techniques disclosed herein may still be used, even if only for the purpose of optimal finger placement.

Still further variations of the present invention include error-checking techniques to ensure that the multi-path modeling approaches discussed above are or remain accurate. One approach is to evaluate the difference (error) between successive real-valued $\hat{h}_{av}$ (modeled, or analytical, channel response values) and $\tilde{h}_{av}$ (an average of measured channel responses), to determine the accuracy of the parametric multi-path modeling. Additional unknown sub-paths, not accounted for in the model for $\hat{h}_{av}$ make the error larger. Accordingly, this error information may be used for making a decision regarding which of two or more GRAKE processing modes should be used. For example, if the difference is large, indicating inaccurate multi-path parametric modeling, non-parametric GRAKE might be selected, in some embodiments of the invention. Similarly, a large difference may also be used as a trigger to restart the whole multi-path algorithm, using new path searcher paths as a starting point and flushing all filtered values.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein:

What is claimed is:

1. A method of estimating a propagation channel response corresponding to a received signal in a wireless communication receiver the method comprising:
    selecting a plurality of receiver processing delays for sampling the received signal so that the plurality of receiver processing delays span two closely spaced channel response delays, a presence of closely spaced channel response delays in the propagation channel response indicated by a variance of error metrics exceeding a pre-determined threshold;
    calculating an average channel coefficient magnitude over at least a first number of time slots of the received signal, for each of the receiver processing delays;
    estimating delay timing for each of the two channel response delays, based on the average channel coefficient magnitudes and a multi-delay superposition model for the channel response for the each of the two closely spaced channel response delays; and
    calculating complex channel gains for each of the two channel response delays, based on the estimated delay timings and channel response measurements taken over a second number of time slots that Is less than the first number of time slots.

2. The method of claim 1, further comprising estimating delay timing for each of the two channel response delays comprises comparing the average channel coefficient magnitudes calculated for each of the receiver processing delays to a plurality of hypotheses derived from the multi-delay superposition model, each hypothesis comprising hypothesized channel gain information for the two channel response delays and hypothesized times corresponding to each of the two channel response delays.

3. The method of claim 2, wherein the hypothesized channel gain information for the two channel response delays comprises a hypothesized channel gain ratio for the two channel response delays.

4. The method of claim 1, wherein the channel response measurements taken over the second number of time slots comprise measurements of received pilot symbols at each of the receiver processing delays.

5. The method of claim 1, further comprising selecting the first number of slots based on an estimated speed of the wireless communication receiver.

6. The method of claim 1, further comprising first determining that the two closely spaced channel response delays are present In the propagation channel response by:
    calculating estimated net channel coefficients for a plurality of time slots of the received signal, using a single-path channel model for a reported or calculated propagation response delay; and
    computing a plurality of error metrics based on the estimated net channel coefficients and corresponding channel response measurements taken over the time slots.

7. The method of claim 6, further comprising computing a plurality of error metrics based on the estimated net channel coefficients and corresponding channel response measurements taken over the time slots comprises computing an ISI-weighted error metric based on the estimated net channel coefficients, the channel response measurements, and inter-symbol interference estimates corresponding to one or more of the receiver processing delays.

8. The method of claim 1, further comprising:
    comparing successive analytical channel response values computed from the complex channel gains and the estimated delay timings to an average of measured channel response values to obtain an accuracy indicator; and
    selecting one of two or more receiver processing modes based on the accuracy indicator.

9. The method of claim 1, further comprising using the calculated complex channel gains or the estimated delay timing, or both, in one or more receiver processes that are selected from:
    computing an impairment covariance matrix;
    cancelling synchronization channel interference using a model of a synchronization channel;
    selecting a second plurality of receiver processing delays; and
    estimating Doppler effect.

10. A wireless communication receiver comprising:
    a receiver front-end circuit and
    one or more processing circuits, configured to:
    select a plurality of receiver processing delays for sampling a received signal so that the receiver processing delays span two closely spaced channel response delays, a presence of closely spaced channel response delays in a propagation channel response indicated by a variance of error metrics exceeding a pre-determined threshold;
    calculate an average channel coefficient magnitude over at least a first number of time slots of the received signal, for each of the receiver processing delays;
    estimate delay timing for each of the two channel response delays, based on the average channel coefficient magnitudes and a multi-delay superposition model for the channel response for the each of the two closely spaced channel response delays; and
    calculate complex channel gains for each of the two channel response delays, based on the estimated delay timings and channel response measurements taken over a second number of time slots that Is less than the first number of time slots.

11. The wireless receiver of claim 10, wherein the processing circuits are configured to estimate delay timing for each of the two channel response delays by comparing the average channel coefficient magnitudes calculated for each of the receiver processing delays to a plurality of hypotheses derived from the multi-delay superposition model, each hypothesis comprising hypothesized channel gain information for the two channel response delays and hypothesized times corresponding to each of the two channel response delays.

12. The wireless receiver of claim 11, wherein the hypothesized channel gain information for the two channel response delays comprises a hypothesized channel gain ratio for the two channel response delays.

13. The wireless receiver of claim 10, wherein the processing circuits are configured to collect the channel response measurements taken over the second number of time slots by taking measurements of received pilot symbols at each of the receiver processing delays.

14. The wireless receiver of claim 10, further characterized in that the processing circuits are further configured to select the first number of slots based on an estimated speed of the wireless communication receiver.

15. The wireless receiver of claim 10, further characterized in that the processing circuits are configured to first determine that the two channel response delays are present in the propagation channel response by:
calculating estimated net channel coefficients for a plurality of time slots of the received signal, using a single-path channel model for a reported or calculated propagation response delay; and
computing a plurality of error metrics based on the estimated net channel coefficients and corresponding channel response measurements taken over the time slots.

16. The wireless receiver of claim 15, characterized in that the processing circuits are configured to compute the plurality of error metrics based on the estimated net channel coefficients and corresponding channel response measurements taken over the time slots by computing an ISI-weighted error metric based on the estimated net channel coefficients, the channel response measurements, and inter-symbol interference estimates corresponding to one or more of the receiver processing delays.

17. The wireless receiver of claim 10, wherein the processing circuits are further configured to:
compare successive analytical channel response values computed from the complex channel gains and the estimated delay timings to an average of measured channel response values to obtain an accuracy indicator; and
select one of two or more receiver processing modes based on the accuracy indicator.

18. The wireless receiver of claim 10, characterized in that the processing circuits are further configured to use the calculated complex channel gains or the estimated delay timing, or both, in one or more receiver processes that are selected from:
computing an impairment covariance matrix;
cancelling synchronization channel interference using a model of a synchronization channel;
selecting a second plurality of receiver processing delays; and
estimating Doppler effect.

19. A method of evaluating a propagation channel response corresponding to a received signal in a wireless receiver, the method comprising:
calculating estimated net channel coefficients for a plurality of time slots of the received signal, using a single-path channel model for a reported propagation response delay;
computing a plurality of error metrics based on the estimated net channel coefficients and corresponding channel response measurements taken over the time slots; and
detecting that two or more closely spaced channel response delays are present In the propagation channel response by determining that a variance of the error metrics exceeds a pre-determined threshold.

20. The method of claim 19, further comprising:
selecting a plurality of receiver processing delays for sampling the received signal so that that the receiver processing delays span the detected two or more closely spaced channel response delays;
calculating an average channel coefficient magnitude over at least a first number of time slots of the received signal, for each of the receiver processing delays;
estimating delay timing for each of the two channel response delays, based on the average channel coefficient magnitudes and a multi-delay superposition model for the channel response; and
calculating complex channel gains for each of the two channel response delays, based on the estimated delay timings and channel response measurements taken over a second number of time slots that is less than the first number of time slots.

21. A wireless communication receiver comprising:
a receiver front-end circuit and
one or more processing circuits, the processing circuits being configured to:
calculate estimated net channel coefficients for a plurality of time slots of a received signal, using a single-path channel model for a reported propagation response delay;
compute a plurality of error metrics based on the estimated net channel coefficients and corresponding channel response measurements taken over the time slots; and
detect that two or more closely spaced channel response delays are present in a propagation channel response corresponding to the received signal by determining that a variance of the error metrics exceeds a pre-determined threshold.

22. The wireless communication receiver of claim 21, wherein the one or more processing circuits are further configured to:
select a plurality of receiver processing delays for sampling the received signal so that that the receiver processing delays span the detected two or more closely spaced channel response delays;
calculate an average channel coefficient magnitude over at least a first number of time slots of the received signal, for each of the receiver processing delays;
estimate delay timing for each of the two channel response delays, based on the average channel coefficient magnitudes and a multi-delay superposition model for the channel response; and
calculate complex channel gains for each of the two channel response delays, based on the estimated delay timings and channel response measurements taken over a second number of time slots that is less than the first number of time slots.

* * * * *